(12) United States Patent
Watanabe

(10) Patent No.: US 8,649,040 B2
(45) Date of Patent: Feb. 11, 2014

(54) ENHANCED SECURITY PRINTING METHOD, AND PRINTING SYSTEM AND IMAGE FORMING DEVICE THEREFOR

(75) Inventor: Kenichi Watanabe, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 976 days.

(21) Appl. No.: 12/339,119

(22) Filed: Dec. 19, 2008

(65) Prior Publication Data

US 2009/0168095 A1    Jul. 2, 2009

(30) Foreign Application Priority Data

Dec. 27, 2007  (JP) ................................ 2007-338079

(51) Int. Cl.
  *G06F 3/12* (2006.01)
  *G06F 15/00* (2006.01)
  *G06K 1/00* (2006.01)

(52) U.S. Cl.
  USPC ......................................... 358/1.15; 358/1.9

(58) Field of Classification Search
  None
  See application file for complete search history.

(56) References Cited

U.S. PATENT DOCUMENTS

| 7,057,751 | B1 | 6/2006 | Shiraiwa | |
| 2002/0163666 | A1* | 11/2002 | Iwata et al. | 358/1.15 |
| 2003/0025935 | A1* | 2/2003 | Somei | 358/1.15 |
| 2003/0093675 | A1* | 5/2003 | Hibino et al. | 713/168 |
| 2003/0098993 | A1* | 5/2003 | Ohara | 358/1.15 |
| 2004/0196484 | A1 | 10/2004 | Masumoto et al. | |
| 2006/0044607 | A1* | 3/2006 | Kato | 358/1.15 |
| 2007/0086057 | A1* | 4/2007 | Kanada | 358/3.06 |
| 2007/0124800 | A1* | 5/2007 | Kadota | 726/2 |
| 2007/0247653 | A1* | 10/2007 | Hayashi | 358/1.13 |
| 2007/0255949 | A1 | 11/2007 | Miyazaki et al. | |

FOREIGN PATENT DOCUMENTS

| JP | 11-007701 | 1/1999 |
| JP | 2001-277650 | 10/2001 |
| JP | 2003-127472 A | 5/2003 |
| JP | 2005-094700 | 4/2005 |
| JP | 2006-168261 | 6/2006 |
| JP | 2007-004292 A | 1/2007 |
| JP | 2007-188281 A | 7/2007 |
| JP | 2007-268930 | 10/2007 |

OTHER PUBLICATIONS

JP Office Action dtd Dec. 3, 2009, JP Appln. 2007-338079, English translation.

* cited by examiner

*Primary Examiner* — Ming Hon
(74) *Attorney, Agent, or Firm* — Banner & Witcoff, Ltd.

(57) ABSTRACT

A printing method for printing a file stored on an external storage device attached to an image forming device includes steps of transmitting printing instruction information including first print instructing device information that specifies a print instructing device, from the print instructing device configured to issue a printing instruction to the image forming device, to the image forming device, determining whether the first print instructing device information included in the printing instruction information transmitted by the print instructing device is identical to second print instructing device information stored on the external storage device that specifies a print instructing device, and printing the file stored on the external storage device with the image forming device based upon the printing instruction information, when it is determined that the first print instructing device information is identical to the second print instructing device information.

17 Claims, 9 Drawing Sheets

ENHANCED SECURITY PRINTING METHOD, AND PRINTING SYSTEM AND IMAGE FORMING DEVICE THEREFOR

CROSS-REFERENCE TO RELATED APPLICATION

This application claims priority under 35 U.S.C. §119 from Japanese Patent Application No. 2007-338079 filed on Dec. 27, 2007. The entire subject matter of the application is incorporated herein by reference.

BACKGROUND

1. Technical Field

The following description relates to one or more printing techniques, particularly to direct print technique adapted to ensure security.

2. Related Art

Japanese Patent Provisional Publication No. HEI11-007701 (hereinafter referred toas '701 Publication) discloses a direct print technique in which a printer reads out an image data file such as JPEG data from an external storage device such as a CompactFlash (CF, trademark registered), and then develops and prints the file read out.

Thus, it is possible to prevent the image data from being intercepted by a third party while the image data is being transmitted to the printer, with higher security than when the image data is sent by a PC to the printer and thereby printed.

SUMMARY

However, in the printing technique disclosed in '701 Publication, the image data stored on the external storage device might be printed by a third party when the external storage device, which has accidentally fallen into the hands of the third party, is attached to the printer.

Aspects of the present invention are advantageous to provide one or more improved direct print techniques that make it possible to improve security when an image is printed directly from an external storage device.

According to aspects of the present invention, a printing method for printing a file stored on an external storage device attached to an image forming device is provided. The printing method includes a transmitting step of transmitting printing instruction information including first print instructing device information that specifies a print instructing device, from the print instructing device configured to issue a printing instruction to the image forming device, to the image forming device, a determining step of determining whether the first print instructing device information included in the printing instruction information transmitted by the print instructing device is identical to second print instructing device information stored on the external storage device that specifies a print instructing device, and a printing step of printing the file stored on the external storage device with the image forming device based upon the printing instruction information, when it is determined in the determining step that the first print instructing device information is identical to the second print instructing device information.

In some aspects of the present invention, when the first print instructing device information received by the image forming device from the print instructing device is not identical to the second print instructing device information stored on the external storage device, for example, image data (print data main body in the file) is not printed out. Therefore, it is possible to improve security in direct print of the image data stored on the external storage device.

According to aspects of the present invention, further provided is a printing system, which includes an image forming device, a print instructing device configured to issue a printing instruction to the image forming device, a transmitting unit configured to transmit therethrough printing instruction information including first print instructing device information that specifies the print instructing device, from the print instructing device to the image forming device. The image forming device includes an interface configured such that an external storage device is attached thereto, the external storage device storing thereon a file and second print instructing device information that specifies a print instructing device for printing of the file, a receiving unit configured to receive the printing instruction information including the first print instructing device information from the transmitting unit, a determining unit configured to determine whether the first print instructing device information included in the printing instruction information transmitted by the print instructing device is identical to the second print instructing device information stored on the external storage device, and a printing unit configured to print the file stored on the external storage device based upon the printing instruction information, when the determining unit determines that the first print instructing device information is identical to the second print instructing device information.

According to the printing system configured as above, the same effect as the aforementioned printing method can be provided. Specifically, when the first print instructing device information received by the image forming device from the print instructing device is not identical to the second print instructing device information stored on the external storage device, for instance, image data (print data main body in the file) is not printed out. Therefore, it is possible to improve security in direct print of the image data stored on the external storage device.

According to aspects of the present invention, further provided is an image forming device, which includes an interface configured such that an external storage device is attached thereto, the external storage device storing thereon a file and second print instructing device information that specifies a print instructing device, a receiving unit configured to receive printing instruction information including first print instructing device information that specifies an external print instructing device, from the external print instructing device, a determining unit configured to determine whether the first print instructing device information included in the printing instruction information transmitted by the external print instructing device is identical to the second print instructing device information stored on the external storage device, and a printing unit configured to print the file stored on the external storage device based upon the printing instruction information, when the determining unit determines that the first print instructing device information is identical to the second print instructing device information.

According to the image forming device configured as above, the same effect as the aforementioned printing method and printing system can be provided. Specifically, when the first print instructing device information received from the external print instructing device is not identical to the second print instructing device information stored on the external storage device, for instance, image data (print data main body in the file) is not printed out. Therefore, it is possible to improve security in direct print of the image data stored on the external storage device.

BRIEF DESCRIPTION OF THE ACCOMPANYING DRAWINGS

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

Hereinafter, an embodiment according to aspects of the present invention will be described with reference to the accompany drawings.

1. Configuration of Printing System

Figure 1:
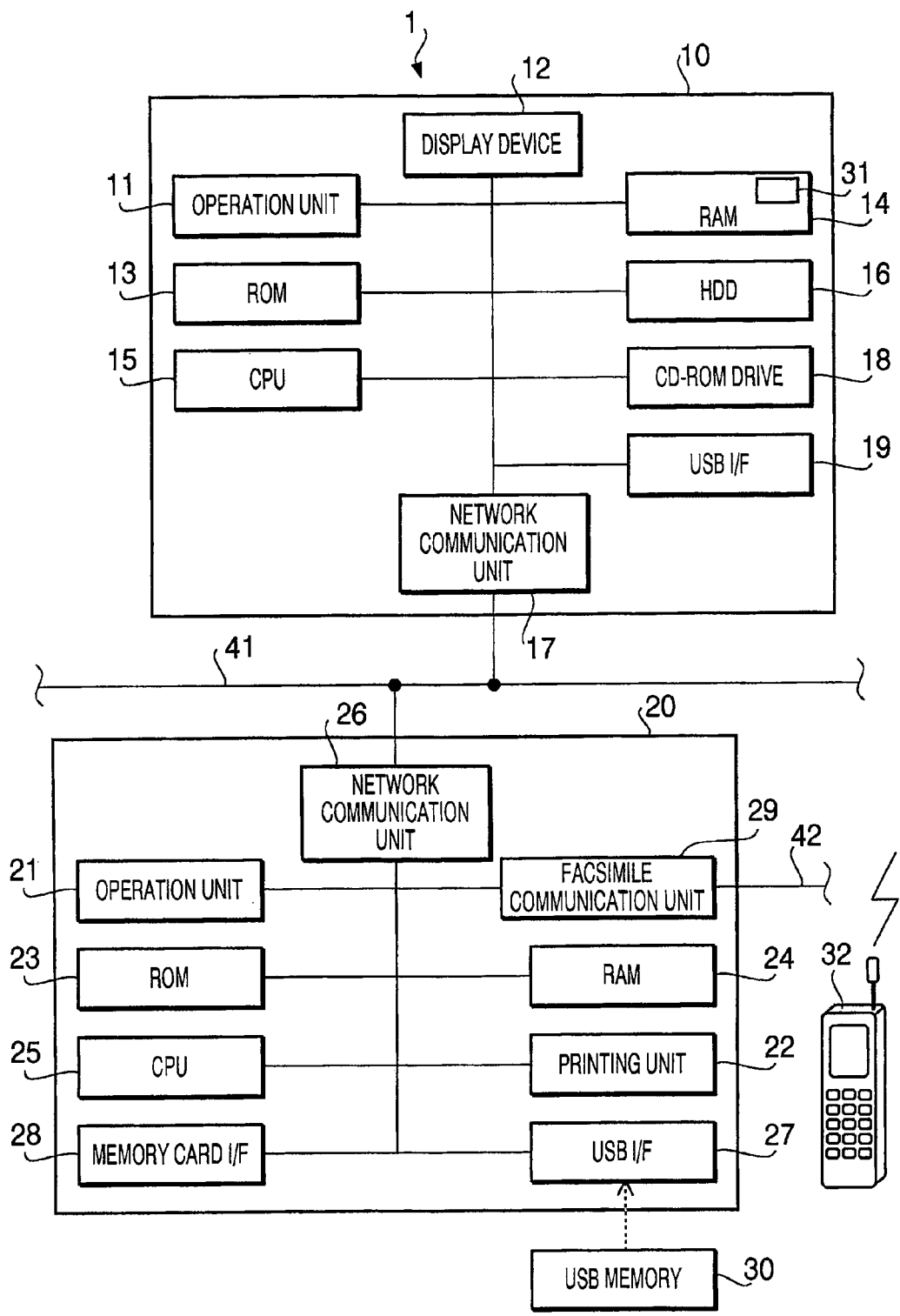
FIG. 1 is a block diagram schematically showing a configuration of a printing system in an embodiment according to one or more aspects of the present invention.

FIG. 1 is a block diagram schematically showing a configuration of a printing system 1 in an embodiment according to aspects of the present invention. The printing system 1 is configured with a terminal device 10 and a printing device 20 being interconnected on a network via a communication line 41.

(1) Terminal Device

The terminal device 10, such as a personal computer, includes an operation unit 11 configured to accept an external input operation through a keyboard or a mouse, a display device 12 such as a liquid crystal display device (LCD), a ROM 13, a RAM 14, a CPU 15, a hard disk drive 16, a network communication unit 17 configured to be linked with the communication line 41, a CD-ROM drive 18, and a USB interface 19.

The RAM 14 temporarily stores thereon an E-mail 31 created. The hard disk drive 16 stores thereon a printer driver and application software.

The CPU reads out the printer driver from the hard disk drive 16 and executes the printer driver based upon an execution command issued through the aforementioned operation unit 11. When a printing instruction and/or a selection for print settings are provided by a user through the operation unit 11, data to be printed that has been created by application software is converted into predetermined format of print data in accordance with the printer driver. Subsequently, the print data is transmitted to the printing device 20 via the network communication unit 17.

Here, the print data (print file) is mainly configured with a header and a print data main body. The header contains various kinds of information such as an IP address of the personal computer 10 (hereinafter referred to as the PC 10), an IP address of the printing device 20, user information, a print instructing time, a document name, and printing instruction portion data including print instructing device information. The print data main body includes data to be actually printed such as image data. It is noted that the print instructing device information and the printing instruction portion data are not necessarily included in the header, namely, in the print file.

(2) Printing Device

The printing device 20 includes an operation unit 21 provided with various keys, a printing unit 22 configured to perform a printing operation on a sheet, a ROM 23, a RAM 24, a CPU 25, an NVRAM (non-volatile memory, not shown), a network communication unit 26, a USB interface 27, a memory card interface 28, and a facsimile communication unit 29.

The ROM 23 stores thereon programs for replying in response to inquiries from the PC 10, programs for performing operations in accordance with instructions from the PC 10, and programs for controlling overall operations of the printing device 20.

The CPU 25 controls each unit of the printing device 20 while storing processing results on the RAM 24 or the NVRAM in accordance with a program stored on the ROM 23. In addition, the CPU 25 takes control to transmit print data received from the PC 10 via the network communication unit 26 to the printing unit 22 in accordance with a program stored on the ROM 23.

The network communication unit 26, which is linked with the communication line 41, is connected with two or more external PCs 10 (note: a single PC 10 is only shown in FIG. 1) via the communication line 41 so as to make possible mutual data communication.

Additionally, the printing device 20 is configured to perform direct print with a USB memory 30 attached to the USB interface 27. In the direct print, for example, an image data file stored on the USB memory 30 is printed directly from the USB memory 30. Further, the memory card interface 28 is provided with card slots (not shown) configured to comply with a variety of memory cards. Therefore, the direct print can be achieved with another external storage device inserted in a card slot of the memory card interface 28 such as a Compact-Flash (CF), a SD Memory Card, and a Memory Stick.

Further, the facsimile communication unit 29, which is connected with a telephone line 42, is configured to accept a printing instruction issued by an external telephone (including a mobile phone) 32 or a fax machine (not shown) via the telephone line 42.

2. Printing Process (1) Process in Terminal Device (PC)

Figure 2:
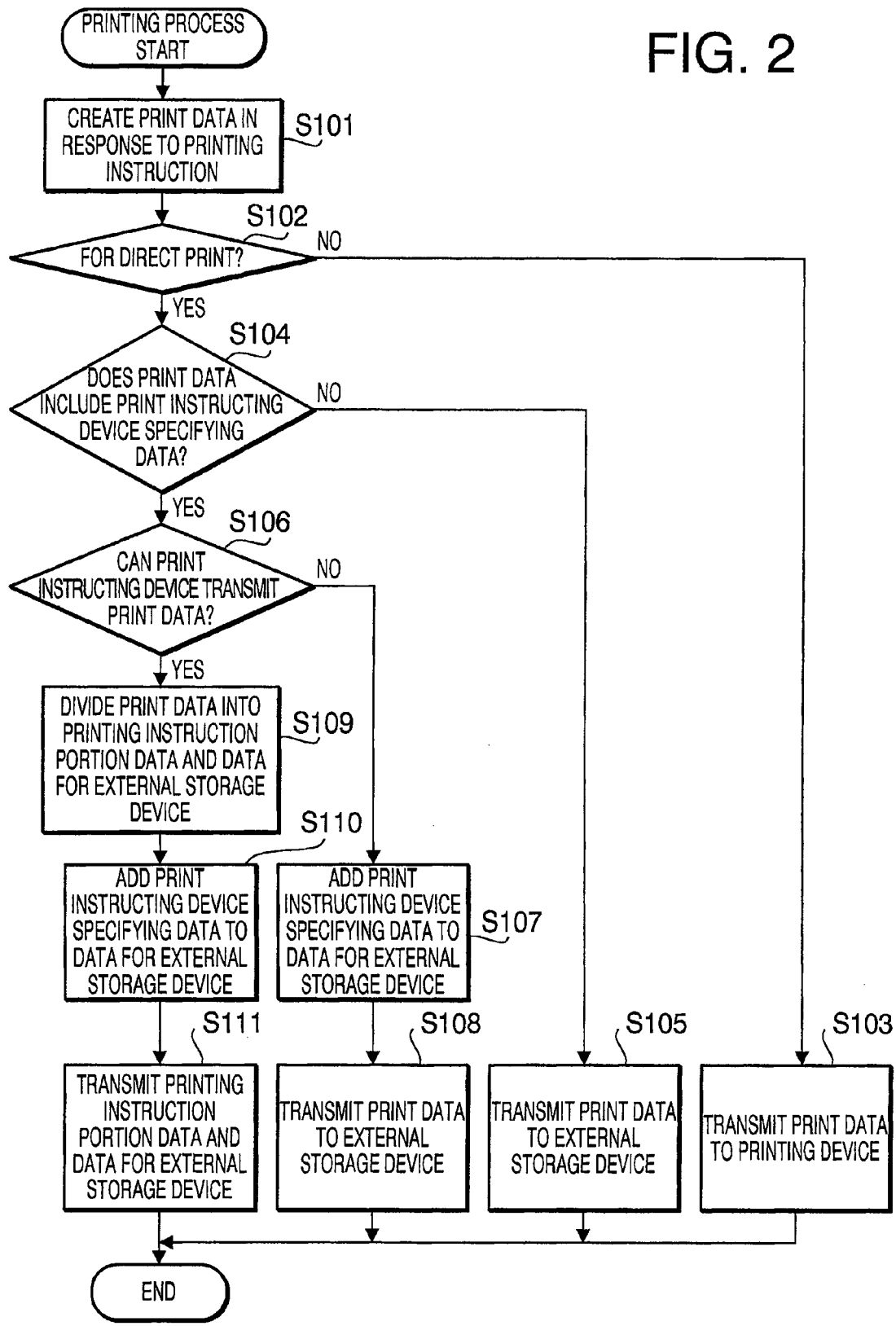
FIG. 2 is a flowchart showing a procedure of a printing process to be executed by a personal computer (PC) in the embodiment according to one or more aspects of the present invention.

FIG. 2 is a flowchart showing a procedure of a printing process to be executed by the PC 10. Each step of the process is performed based upon an instruction of the CPU 15 operated in accordance with a predetermined program (e.g., the printer driver) stored on the PC 10.

For instance, when the printing process is started in response to a printing instruction issued by the user on the display device 12 via the operation unit 11, print data is firstly created in accordance with the printing instruction (S101). Next, it is determined whether the created print data is data for direct print (S102).

When the print data is not data for direct print (S102: No), the print data is transmitted to the printing device 20 (S103), and the present process at a side of the PC 10 is terminated.

Meanwhile, when the print data is data for direct print (S102: Yes), it is determined whether the print data includes print instructing device specifying data that specifies a print instructing device (means) (S104). In other words, in S104, it is determined whether the print data for direct print is regular print data or print data for ensuring security according to aspects of the present invention.

When it is determined that the print data does not include any print instructing device specifying data, namely, when the print data is regular print data for direct print (S104: No), the print data is transmitted, for example, to the USB memory 30 attached to the USB interface 19 (S105). Then, the printing process is terminated.

Meanwhile, when it is determined that the print data includes print instructing device specifying data, namely, when the print data is print data for direct print with security ensured (S104: Yes), it is determined whether it is possible for the print instructing device specified by the print instructing device specifying data to transmit the print data (S106). Specifically, in S106, it is determined whether the print instructing device is a device capable of transmitting the print data such as the PC 10 and a personal digital assistant (PDA) or a device, for which it is hard to transmit the print data, such as the telephone 32 and a facsimile machine.

When it is determined that it is not possible for the print instructing device to transmit the print data, namely, when the print instructing device is the telephone 32 or the facsimile machine (S106: No), print instructing device specifying data is added to print data for an external storage device (corresponding to the print data for direct print) that is all of the print data (S107). Subsequently, the print data for an external storage device with the print instructing device specifying data added thereto is transmitted and stored onto an external storage device such as the USB memory 30 attached to the USB interface 19 (S108). Then, the printing process is terminated.

Meanwhile, when it is determined that it is possible for the print instructing device to transmit the print data, namely, when the print instructing device is the PC 10 or the PDA (S106: Yes), the print data (file) is divided into printing instruction portion data to be temporarily stored on the print instructing device and print data for an external storage device to be stored on the external storage device (S109). It is noted that the printing instruction portion data as one of the print data divided includes the print instructing device specifying data as print instructing device information that specifies the print instructing device.

Then, print instructing device specifying data is added to the print data for an external storage device as one of the print data divided in S109 (S110). Next, the printing instruction portion data is transmitted and stored onto a predetermined memory in the PC 10 such as the RAM 14, and the print data for an external storage device with the print instructing device specifying data added thereto is transmitted and stored onto an external storage device such as the USB memory 30 attached to the USB interface 19 (S111). Then, the printing process is terminated.

(2) Process in Printing Device

Figure 3:
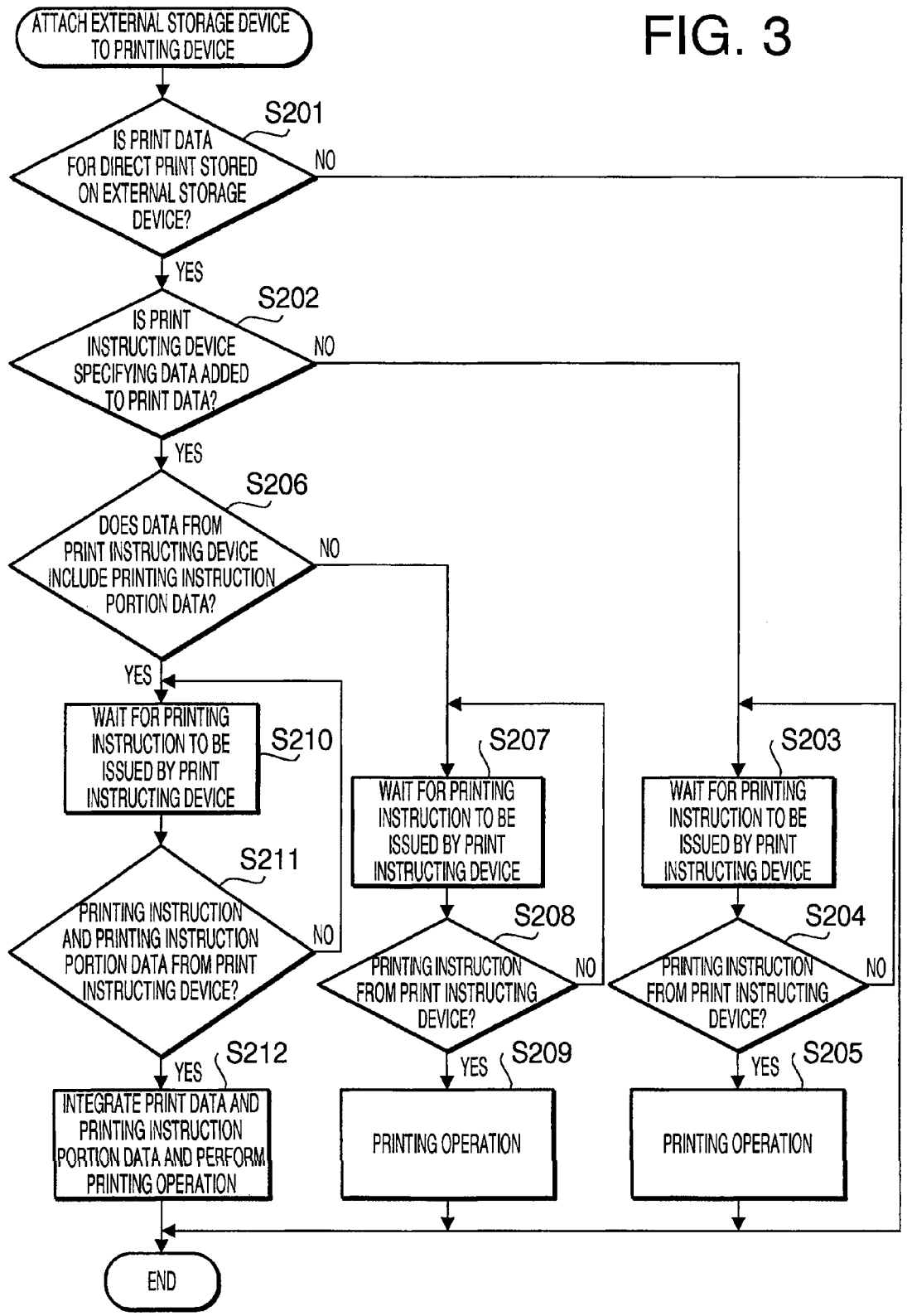
FIG. 3 is a flowchart showing a procedure of a printing process to be executed by a printing device in the embodiment according to one or more aspects of the present invention.

FIG. 3 is a flowchart showing a procedure of a printing process to be executed by the printing device 20. Each step of the process is performed based upon an instruction of the CPU 25 operated in accordance with a predetermined program stored on the ROM 23 of the printing device 20.

For example, when the USB memory 30 as an external storage deice is attached to the USB interface 27, it is determined whether there is print data for direct print stored on the USB memory 30 (S201). When there is not any print data for direct print stored on the USB memory 30 (S201: No), the present process is terminated. Meanwhile, when there is print data for direct print stored on the USB memory 30 (S201: Yes), it is determined whether the print data for direct print stored on the USB memory 30 includes print instructing device specifying data, namely, whether print instructing device specifying data that specifies a print instructing device is added to the print data (S202).

When it is determined that the print data for direct print stored on the USB memory 30 does not include any print instructing device specifying data, namely, in the case of regular direct print (S202: No), the CPU 25 waits for a printing instruction to be issued by the print instructing device such as the PC 10 (S203). Then, it is determined whether a printing instruction is issued by the print instructing device (S204). When it is determined that a printing instruction is not issued by the print instructing device (S204: No), the present process goes back to S203, in which the CPU 25 waits for a printing instruction to be issued. Meanwhile, when it is determined that a printing instruction is issued by the print instructing device (S204: Yes), a printing operation is performed (S205). Thereafter, the present process is terminated. It is noted that, in the case of regular direct print, the printing instruction may be inputted via the operation unit 21 of the printing device 20.

Meanwhile, when it is determined that the print data for direct print from the USB memory 30 includes print instructing device specifying data, namely, when the direct print is performed with security ensured (S202: Yes), it is determined whether the data from the print instructing device includes additional data, namely, whether the data from the print instructing device includes the printing instruction portion data as one of the print data divided in S109 (S206). It is noted that, at the time of this determination in S206, the printing instruction portion data has been given to the printing device 20.

When it is determined that the data from the print instructing device does not include the printing instruction portion data (S206: No), the CPU 25 waits for a printing instruction to be issued by the print instructing device such as the telephone 32 (S207). Then, it is determined whether a printing instruction is issued by the print instructing device (S208). When it is determined that a printing instruction is not issued by the print instructing device (S208: No), the present process goes back to S207, in which the CPU 25 waits for a printing instruction to be issued. Meanwhile, when it is determined that a printing instruction is issued by the print instructing device (S208: Yes), a printing operation is performed (S209). After that, the present process is terminated.

Meanwhile, when it is determined that the data from the print instructing device includes the printing instruction portion data, namely, when the print instructing device is, for instance, the PC 10 (S206: Yes), the CPU 25 waits for a printing instruction to be issued by the print instructing device such as the PC 10 (S210). Then, it is determined whether a printing instruction is transmitted along with the printing instruction portion data by the print instructing device (S211). When it is determined that a printing instruction is not transmitted along with the printing instruction portion data by the print instructing device (S211: No), the present process goes back to S210, in which the CPU 25 waits for a printing instruction to be issued. When it is determined that a printing instruction is transmitted along with the printing instruction portion data by the print instructing device (S211: Yes), the print data for direct print and the printing instruction portion data are integrated, and a printing operation is performed based upon the integrated data (S212). Thereafter, the present process is terminated.

3. Examples of Printing Operations by Various Print Command Issuing Devices

Subsequently, examples of printing operations by various print instructing devices will be described. It is noted that, in the following description, a redundant explanation regarding the same or like configurations will be omitted, and only different configurations will be explained.

PRACTICAL EXAMPLE 1

A practical example 1 provides an example in which the print instructing device is an information terminal device such as the PC 10 or a PDA.

(Creation of Print Data)

Figure 4:
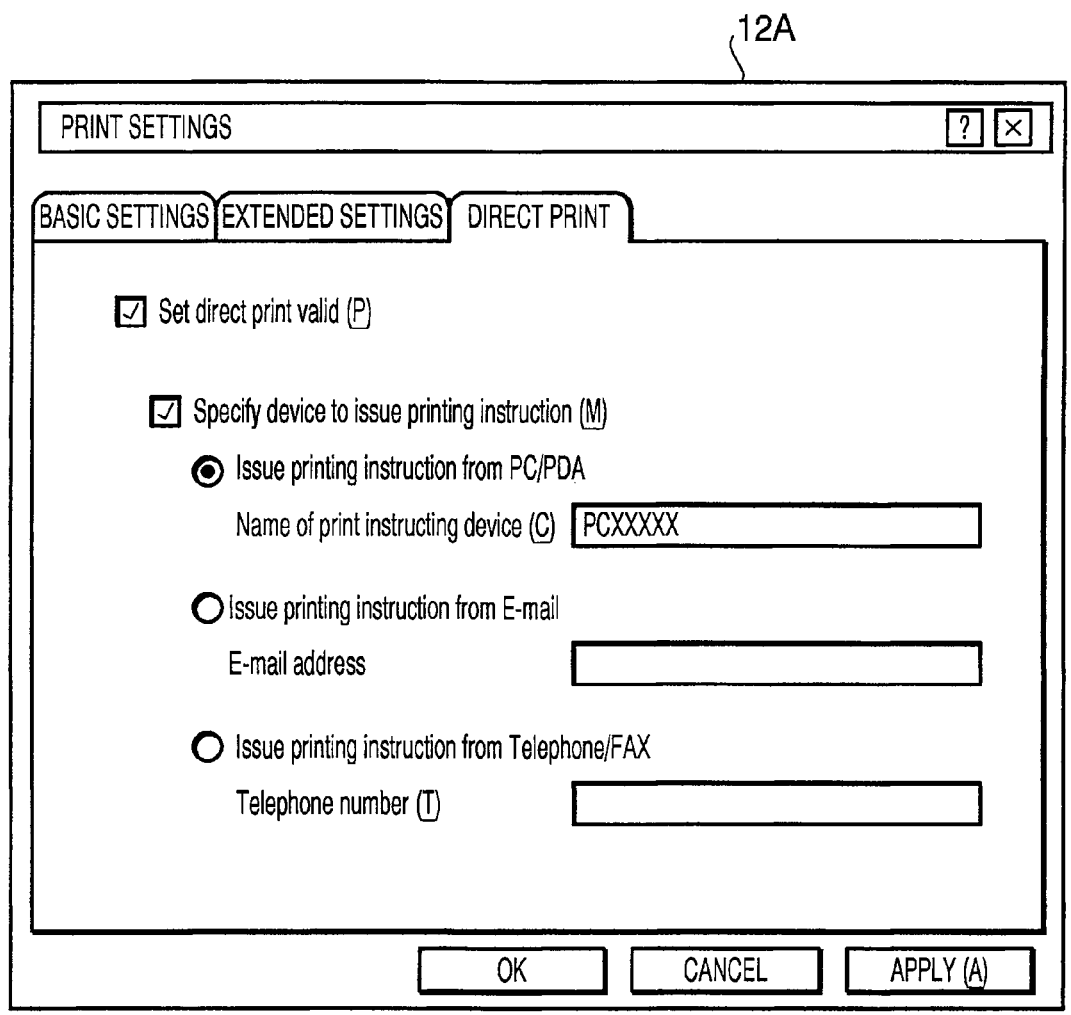
FIG. 4 is a schematic diagram showing a print setting screen on which a print instructing device (means) is specified in the embodiment according to one or more aspects of the present invention.

In creation of print data, firstly, a document (file) for direct print is opened, for instance, on the display device 12 of the PC 10 via the operation unit 11. Next, the printer driver is set. For example, a print setting screen 12A as shown in FIG. 4 is opened. Further, a tab of direct print is selected, and "Set direct print valid" and "Specify device to issue printing instruction" are checked. Then, in this example, "Issue printing instruction from PC/PDA" is selected, and a predetermined device name specifying the PC 10 is inputted in an edit box of "Name of print instructing device." Then, an "OK" button is pressed.

In response to the above operations, the CPU 15 creates regular print data complying with each printing instruction in accordance with the printer driver. At a time when a process to prepare for printing of the document is completed, as described above, the print data (file) is divided into printing instruction portion data for the PC 10 and print data for the USB memory 30.

In this case, for example, the print data is divided into the header as the printing instruction portion data and the print data main body as the data for the USB memory 30. It is noted that the way the print data is divided may be determined depending on a security level to be ensured as needed. For example, the print data may be divided at the header such that the header is separated into two parts, or may be divided at the print data main body such that the print data main body is separated into two parts.

Subsequently, data to be stored on the USB memory 30 is created by adding, to the print data for the USB memory 30, a device name (more specifically, data regarding a device name) of the PC 10 in the practical example 1 as the print instructing device specifying data that specifies the print instructing device. In a state where the USB memory 30 is attached to the USB interface 19 of the PC 10, the CPU 15 stores, on the USB memory 30, the device name of the PC 10 along with the print data for the USB memory 30.

Meanwhile, the CPU 15 temporarily stores the printing instruction portion data on a predetermined memory such as the RAM 14 in the PC 10. This is the end of the creation of the print data in the practical example 1. It is noted that, here, the device name of the PC 10 as print instructing device information is added to each file of the print data. In this case, since the print instructing device information is added to each print file, it is possible to store files created by different print instructing devices on the single USB memory 30.

Thus, in the present embodiment, the user can select a print instructing device on the print setting screen 12A displayed on the display device 12 of the PC 10, for example, through the operation unit 11 of the PC 10. Then, based upon the selection of the print instructing device, the CPU 15 creates the print file with information regarding the selected print instructing device added thereto.

(Printing of Print Data)

Figure 5:
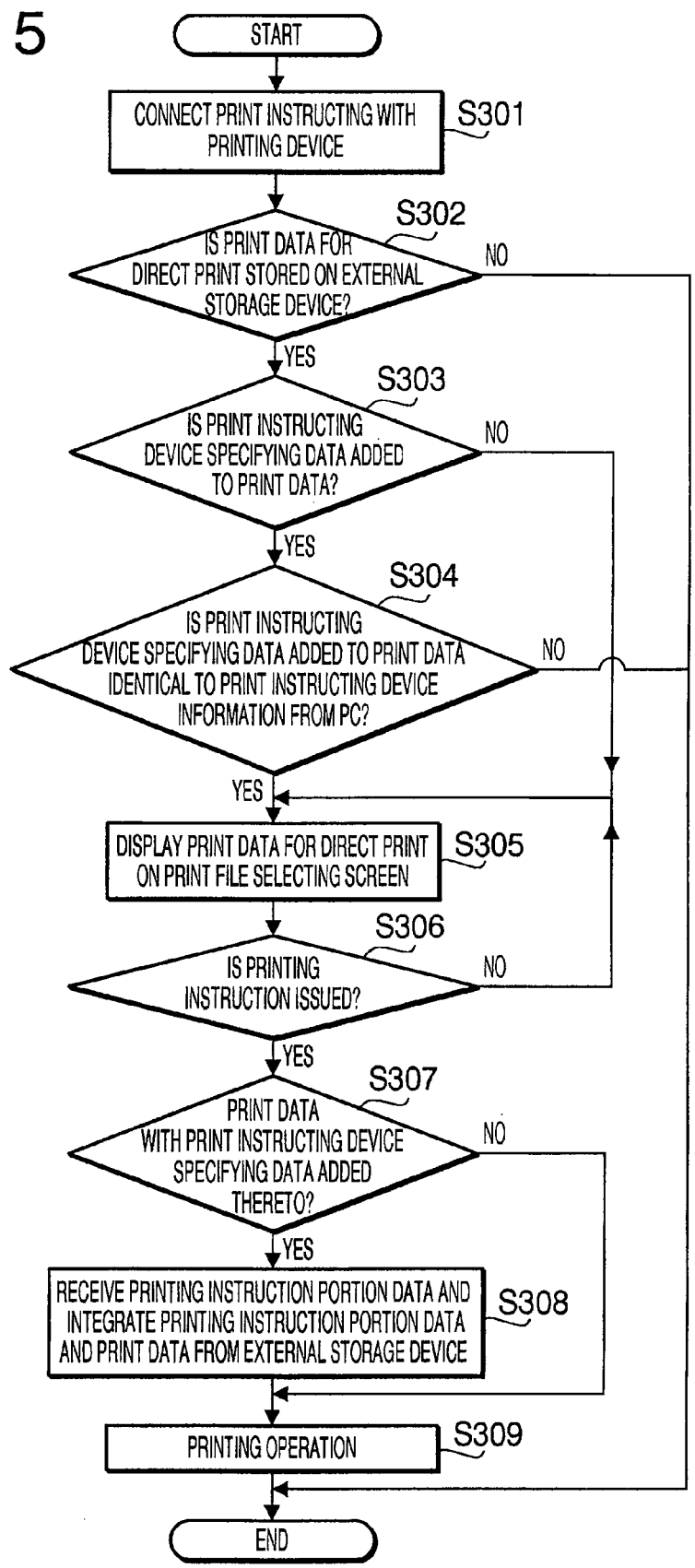
FIG. 5 is a flowchart showing a procedure of a printing process to be executed by the printing device in response to a printing instruction issued by the PC in the embodiment according to one or more aspects of the present invention.

FIG. 5 is a flowchart showing a procedure of a printing process in the practical example 1, namely, in the case where the print instructing device is the PC 10. This process is launched when the USB memory 30 is attached into the USB interface 27 of the printing device 20. Firstly, the PC 10 is connected with the printing device 20 so as to perform data communication therebetween (S301). At this time, print instructing device information that specifies the PC 10 as a print instructing device is received from the PC 10.

Subsequently, as mentioned above, it is determined whether there is print data for direct print stored on the USB memory 30 (S302). When there is not any print data for direct print stored on the USB memory 30 (S302: No), the present process is terminated. Meanwhile, when there is print data for direct print stored on the USB memory 30 (S302: Yes), it is determined whether the print data for direct print from the USB memory 30 includes the print instructing device specifying data, namely, whether the data regarding the device name of the PC 10 is added to the print data (S303).

When it is determined that the print data for direct print from the USB memory 30 includes the print instructing device specifying data, namely, in the case of regular direct print (S303: No), for example, the print data for direct print is provided to the PC 10 and displayed on the display device 12 of the PC 10 (S305). Then, it is determined whether a printing instruction is issued from one of the PC 10 and the operation unit 21 of the printing device 20 (S306). When a printing instruction is not issued (S306: No), the present process goes back to S305, in which the CPU 25 waits for a printing instruction to be issued. It is noted that, in the case of regular direct print, when the printing device 20 is provided with a display device, the print data for direct print may be displayed on the display device of the printing device 20. Alternatively, in the case of regular direct print, an operation of displaying the print data for direct print in S305 may be omitted, and it may be determined in S306 whether a printing instruction is issued via the operation unit 21 of the printing device 20.

Meanwhile, when it is determined that the print data for direct print from the USB memory 30 does not include the print instructing device specifying data (S303: Yes), the device name of the PC 10 as the print instructing device specifying data added to the print data for an external storage device (for the USB memory 30) is compared with a device name of the PC 10 as the print instructing device information received from the PC 10 (S304). Then, when it is determined based upon the comparison that the two device names are not the same (S304: No), the present process is terminated. Therefore, when the two device names are not the same, the direct print is not carried out, and the print data regarding the device name stored on the USB memory 30 is protected. Additionally, in this case, the print data for direct print is not provided to the PC 10 or displayed on the display device 12 of the PC 10. Hence, it is possible to improve security of the print data for direct print.

Meanwhile, when it is determined based upon the comparison that the two device names are the same, and the PC 10 is certified (S304: Yes), the CPU 25 provides the PC 10 with the print data for direct print (file information for file selection). Then, the file information for file selection is displayed, for example, on a print file selecting screen on the display device 12 of the PC 10 (S305). The user selects a print file that the user wishes to directly print on the print file selecting screen, for example, through the operation unit 11.

Subsequently, it is determined whether a printing instruction is issued (S306). When a printing instruction is not issued (S306: No), the present process goes back to S305, in which the CPU 25 waits for a printing instruction to be issued. Meanwhile, when a printing instruction is issued (S306: Yes), it is determined whether the print data to be printed is data with the print instructing device specifying data added thereto (or data for regular direct print with no print instructing device specifying data added) (S307). When the print data to be printed is data for regular direct print (S307: No), the present process advances to S309, in which a printing operation is performed. After that, the present process is terminated.

Meanwhile, when the print data to be printed is data with the print instructing device specifying data added thereto (S307: Yes), printing instruction portion data is received from the PC 10 (S308). At this time, the CPU 15 transmits, via the network communication unit 17 of the PC 10, printing instruction portion data corresponding to the file selected in S305 to the printing device 20. Then, the printing instruction portion data received from the PC 10 and the print data stored on the USB memory 30 are integrated. Thereafter, a printing operation is carried out based upon the print data integrated (S309), and the present process is terminated.

PRACTICAL EXAMPLE 2

A practical example 2 provides an example in the case where the print instructing device (means) is the E-mail 31. Namely, in the practical example 2, a printing instruction for direct print is issued by the E-mail 31 to the printing device 20.

(Creation of Print Data)

Figure 6:
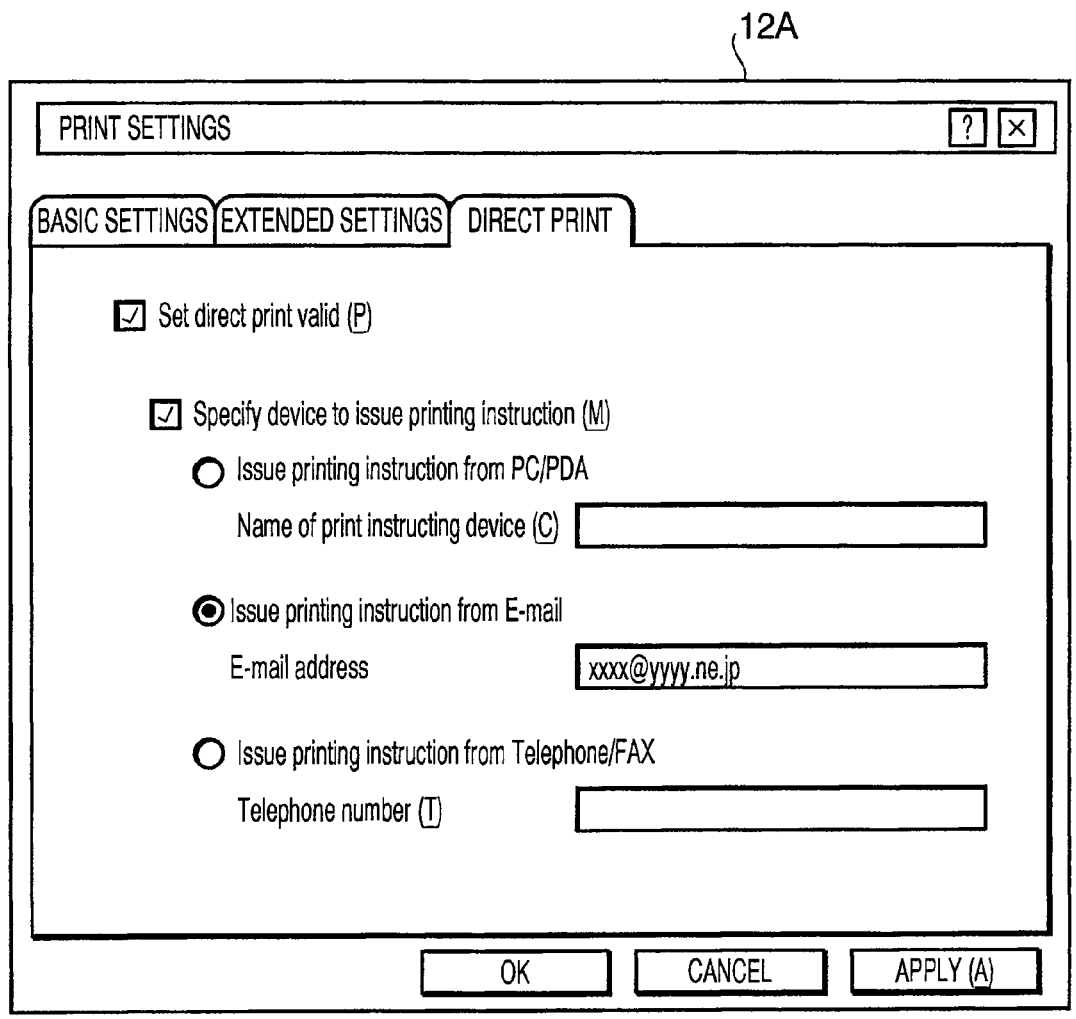
FIG. 6 is a schematic diagram showing the print setting screen on which a print instructing device (means) is specified in the embodiment according to one or more aspects of the present invention.

In the practical example 2, the print data is created substantially in the same manner as the practical example 1. A different point therebetween is, as illustrated in FIG. 6, that "Issue printing instruction from E-mail" is selected from the options of "Specify device to issue printing instruction" on the print setting screen 12A of the PC 10, and a predetermined E-mail address of an E-mail adopted to issue a print instruction is inputted in an edit box of "E-mail address." Thereby, in the practical example 2, stored data for the USB memory 30 is created with the E-mail address (more specifically, data regarding the E-mail address) added to the print data for an external device (for the USB memory 30), i.e., the print data for direct print. Then, the stored data as created is stored onto the USB memory 30.

It is noted that, for example, a file name of the print data (file) for the USB memory 30 is used as a mail title of the E-mail 31 adopted to issue an printing instruction, and the printing instruction portion data as one of the print data divided is transmitted to the printing device 20 as an attached file of the E-mail 31.

(Printing of Print Data)

Figure 7:
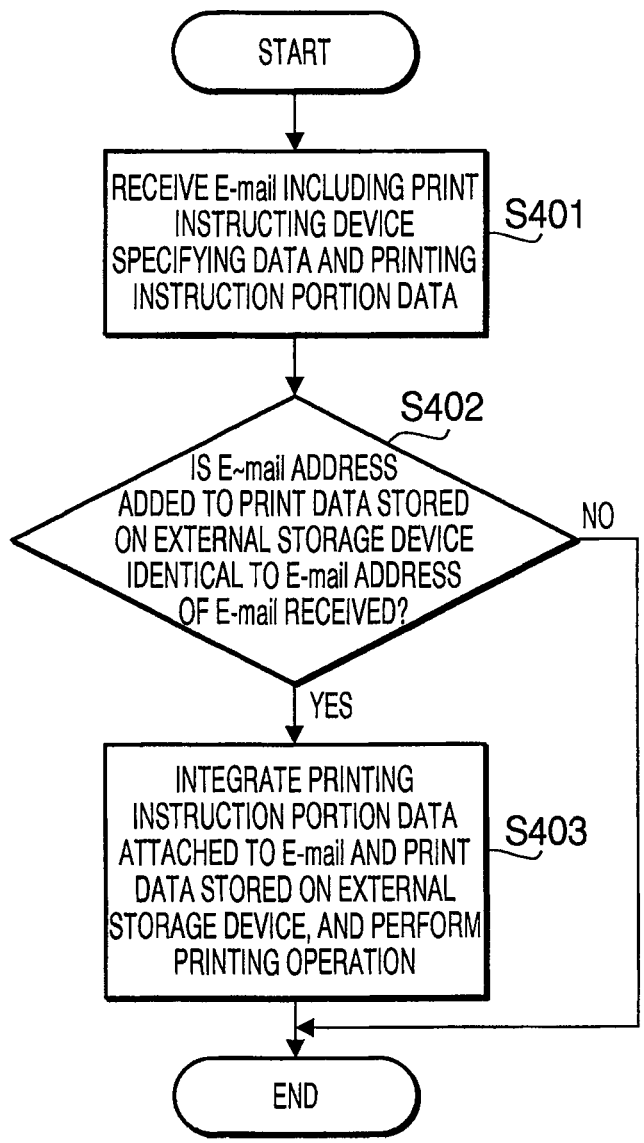
FIG. 7 is a flowchart showing a procedure of a printing process to be executed by the printing device in response to a printing instruction issued from an E-mail in the embodiment according to one or more aspects of the present invention.

FIG. 7 is a flowchart exemplifying a procedure of a printing process in the practical example 2, namely, in the case where a printing instruction is issued from the E-mail. This process is launched when the USB memory 30 is attached to the USB interface 27 of the printing device 20.

Firstly, for example, the E-mail 31, which includes print data designation (e.g., the file name of the print data) and the printing instruction portion data, is received from the PC 10 (S401).

Subsequently, the E-mail address added to the print data for the USB memory is compared with an E-mail address of the E-mail 31 received from the PC 10 (S402). When the two E-mail addresses are not identical (S402: No), the present process is terminated.

Meanwhile, when the two E-mail addresses are identical (S402: Yes), the printing instruction portion data attached to the E-mail 31 is integrated with the print data stored on the USB memory 30, and a printing operation is performed (S403). Then, the present process is terminated after an intended printed material is printed out.

PRACTICAL EXAMPLE 3

A practical example will provide an example in which the print instructing device is the telephone (including a mobile phone) 32 or the fax machine. In this example, a printing instruction for direct print is issued by the telephone 32 or the fax machine to the printing device 20.

(Creation of Print Data)

Figure 8:
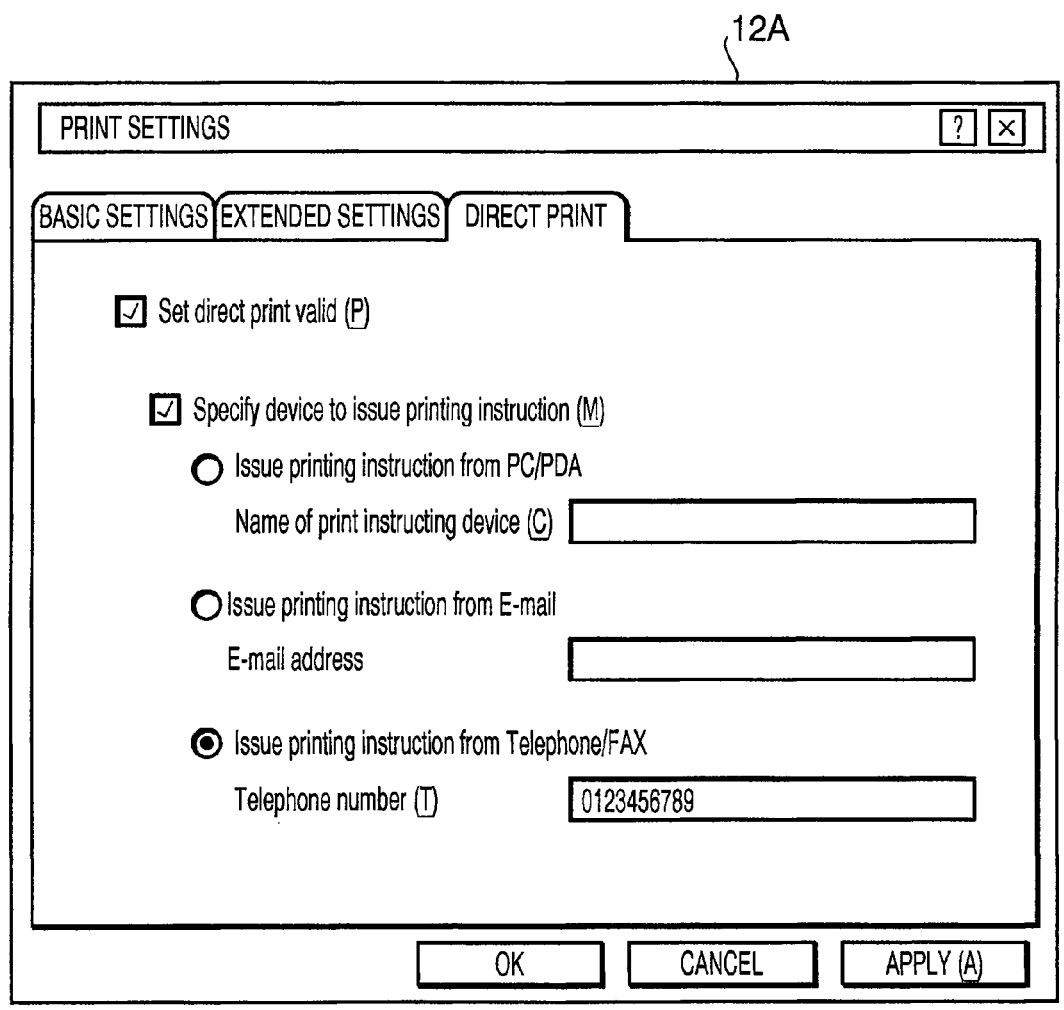
FIG. 8 is a schematic diagram showing the print setting screen on which a print instructing device (means) is specified in the embodiment according to one or more aspects of the present invention.

A procedure to create print data in the practical example 3 is substantially identical to the practical example 1. The practical example 3 is different from the practical example 1 in that, as shown in FIG. 8, for "Specify device to issue printing instruction" on the print setting screen 12A, "Issue printing instruction from telephone/fax machine" is selected, and a predetermined telephone number of the telephone to issue the printing instruction is inputted in a section "Telephone number." Namely, in the practical example 3, the print data for the USB memory is stored on the USB memory 30 with the telephone number added thereto.

It is noted that, since it is not easy for the telephone/fax machine that issues the printing instruction to transmit print data to the printing device 20, the print data (file) is not divided in the practical example 3. Namely, all the print data and the telephone number are stored on the USB memory 30.

(Printing of Print Data)

Figure 9:
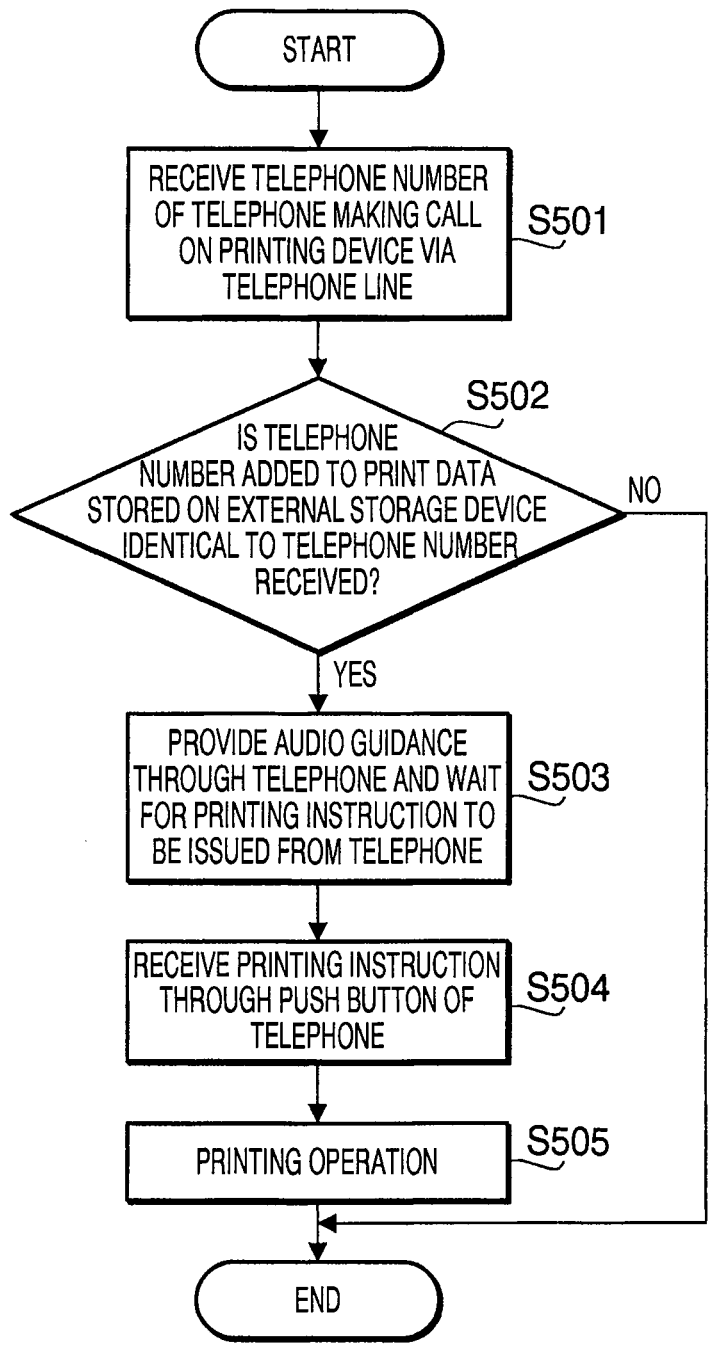
FIG. 9 is a flowchart showing a procedure of a printing process to be executed by the printing device in response to a printing instruction issued by a telephone in the embodiment according to one or more aspects of the present invention.

FIG. 9 is a flowchart showing a procedure of a printing process in the practical example 3, namely, when the printing instruction is issued by the telephone/fax machine. This process is launched after the USB memory 30 is attached to the USB interface 27 of the printing device 20.

Firstly, for example, by a known number display function, a telephone number of the telephone 32 that has the telephone number set on the print setting screen 12A of the PC 10 and has made a call on the printing device 20 via the telephone line 42 is received (S501).

Then, the printing device 20 compares the telephone number added to the print data for the USB memory with the acquired telephone number of the telephone 32 (S502). When the telephone numbers are not identical (S502: No), the present process is terminated.

Meanwhile, when the telephone numbers are identical (S502: Yes), for example, the printing device 20 provides audio guidance to help a telephone user issue a printing instruction through the telephone 32, and waits for the printing instruction to be issued from the telephone 32 (S503). Thereafter, for instance, when the telephone user presses a push button "1" to issue the printing instruction in accordance with the audio guidance (S504), the printing device 20 performs an actual printing operation (S505). Then, the present process is terminated after an intended printed material is printed out.

4. Effects of Embodiment

In the present embodiment, when the print instructing device information received by the printing device 20 from an external print instructing device such as the PC 10 is not identical to the print instructing device specifying data added to the print data for the external storage device stored on the external storage device such as the USB memory 30, for instance, image data (the print data main body included in the print file) is not printed out. Here, the device name of the PC 10, the E-mail address, and the telephone number, which are used as the print instructing device information, have uniqueness. Therefore, they are hardly detected accidentally in comparison with a regularly used password. Hence, it is possible to improve security when a print file such as image data stored on the external storage device such as the USB memory 30 is printed directly from the external storage device.

Further, in the present embodiment, Since the print instructing device information is added to each file of the print data, it is possible to store print files by different print instructing devices on the single external storage device. For example, it is possible to store, on the single USB memory 30, print files for which printing instructions are to be issued by the PC 10, the E-mail 31, and the mobile phone 32, respectively.

Additionally, in the present embodiment, the print data is divided into the printing instruction portion data and the print data for the external storage device to be stored on the external storage device such as the USB memory 30. Therefore, even though the print data stored on the USB memory 30 is printed out, it is possible to prevent printed information from being known by others depending on how the print data is divided. Accordingly, it is possible to improve security when a print file stored on the external storage device is printed directly from the external storage device.

Furthermore, when the print instructing device specifying data added to the print data for the external storage device is not identical to the print instructing device information transmitted by the information terminal device such as the PC 10, file information for file selection is not provided to the information terminal device. Therefore, the information terminal device cannot display the print file selecting screen or file information. Thus, it is possible to improve security when a print file stored on the external storage device is directly printed with the print file selecting screen.

When the print instructing device specifying data added to the print data for the external storage device is confirmed to be identical to the print instructing device information transmitted by the information terminal device such as the PC 10, the file information regarding the print files stored on the external storage device such as the USB memory 30 is displayed on the print file selecting screen. Hence, it is possible to select a file to be printed directly from the external storage device.

Hereinabove, the embodiments according to aspects of the present invention have been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

<Modifications>

In the aforementioned embodiment, the printing system 1 is configured with the PC 10 and the printing device 20 being interconnected on the network via the communication line 41. However, the PC 10 and the printing device 20 may be linked through local connection using a USB cable.

The aforementioned embodiment provides an example in which the USB memory 30 is used as the external storage device. However, the external storage device may include a memory card such as a SD memory card, a CompactFlash, and a Memory Stick. In such a case, each memory card may be attached into a corresponding slot of the memory card interface 28 of the printing device 20.

In the aforementioned embodiment, the printing device 20 is configured as a multifunction peripheral to perform facsimile communication as well. However, aspects of the present invention may be applied to a printing device provided only with a printer function. In addition, the printing device 20 may be configured for color printing or monochrome printing.

In the aforementioned embodiment, the print instructing device information such as the device name of the PC 10 is added to each file of the print data. However, the print instructing device information may be added just one time to a plurality of print files for the external storage device to be stored on the external storage device such as the USB memory 30. In this case, since the print instructing device information is not added to each of the print files, a storage area on the external storage device to store the print data (file) can efficiently be utilized.

In the aforementioned embodiment, the E-mail 31, which is the print instructing device, transmitted by the PC 10 to the printing device 20. However, an E-mail, which is the print instructing device, may be sent by the mobile phone to the printing device 20.

In the aforementioned embodiment, the user can specify the print instructing device on the print setting screen 12A of the display device 12 of the PC 10. However, only the information terminal device such as the PC 10 may be provided as the print instructing device.

In the aforementioned embodiment, when the print instructing device is the PC 10 or the E-mail 31, the print data (file) is divided. However, even when the print instructing device is the PC 10 or the E-mail 31, the print data (file) may not be divided as well as when the print instructing device is the telephone 32.

What is claimed is:

1. A printing method for printing, at an image forming device, a file which is stored in a memory of an external storage device attached to the image forming device through an interface, comprising:
   a first receiving step of receiving, at the image forming device, printing instruction information from a print instructing device provided outside the image forming device, wherein the printing instruction information includes first print instructing device information that specifies the print instructing device which issued the printing instruction information;
   a second receiving step of receiving, from the external storage device, through the interface, second print instructing device information, stored on the external storage device, and that specifies a print instructing device for printing of the file;
   a determining step of determining at the image forming device whether the first print instructing device information included in the printing instruction information received from the print instructing device outside the image forming device is identical to the second print instructing device information received from the external storage device, through the interface and that specifies a print instructing device; and
   a printing step of printing the file stored on the external storage device with the image forming device based upon the printing instruction information, when it is determined in the determining step that the first print instructing device information is identical to the second print instructing device information.

2. The printing method according to claim 1, further comprising a storing step of storing the second print instructing device information onto the external storage device separately from the file.

3. The printing method according to claim 1, further comprising a storing step of storing, onto the external storage device, the file with the second print instructing device information added thereto.

4. The printing method according to claim 3, further comprising:
   a third receiving step of receiving a selection of the print instructing device on a print setting screen of an information terminal device; and
   a file creating step of creating the file with the second print instructing device information added thereto when a specific type of device is received as the selection of the print instructing device in the first receiving step.

5. The printing method according to claim 4, further comprising a dividing step of dividing the file created in the file creating step into stored data to be stored on the external storage device and printing instruction portion data as the printing instruction information when the information terminal device is received as the selection of the print instructing device in the first receiving step,
   wherein the storing step includes a step of storing, onto the external storage device, the stored data with the second print instructing device information added thereto, and storing the printing instruction portion data onto the information terminal device.

6. The printing method according to claim 5,
   wherein the determining step includes a step of determining whether the first print instructing device information included in the printing instruction portion data stored on the information terminal device is identical to the second print instructing device information added to the stored data stored on the external storage device, and
   wherein the printing step includes a step of printing the stored data stored on the external storage device when it is determined in the determining step that the first print instructing device information is identical to the second print instructing device information.

7. The printing method according to claim 5, further comprising a fourth receiving step of receiving a selection of the file to be printed stored on the external storage device on a file selecting screen of the information terminal device,
   wherein the printing step includes a step of printing the file received as the selection in the second receiving step, and
   wherein the first receiving step includes a step of receiving the printing instruction portion data corresponding to the file received as the selection prior to printing the file.

8. The printing method according to claim 7,
   wherein the determining step includes a step of determining whether the information terminal device that displays the file selecting screen in the second receiving step is identical to a device specified by the second print instructing device information stored on the external storage device,
   wherein the printing method further comprising a providing step of providing the information terminal device with file information for file selection when it is determined in the determining step that the information terminal device that displays the file selecting screen in the second receiving step is identical to the device specified by the second print instructing device information stored on the external storage device.

9. The printing method according to claim 1, wherein the receiving step includes a step of receiving via an E-mail the printing instruction information including address information as the first print instructing device information, and
   wherein the determining step includes a step of determining whether the address information included in the printing instruction information received in the receiving step is identical to address information as the second print instructing device information stored on the external storage device.

10. The printing method according to claim 1,
    wherein the receiving step includes a step of receiving via a phone the printing instruction information including a phone number as the first print instructing device information, and
    wherein the determining step includes a step of determining whether the phone number included in the printing instruction information received in the receiving step is identical to a phone number as the second print instructing device information stored on the external storage device.

11. The printing method according to claim 1, wherein the printing method is a direct print method, wherein the file stored on the memory of the external device is printed directly from the memory of the external device when the external device is attached to the image forming device.

12. A printing system, comprising:
    an image forming device;
    a print instructing device provided outside the image forming device and configured to issue a printing instruction to the image forming device; and
    a transmitting unit configured to transmit printing instruction information from the print instructing device to the image forming device, wherein the printing instruction information includes first print instructing device information that specifies the print instructing device which issued the printing instruction information, wherein the image forming device comprises:
an interface configured to receive an external storage device which stores in a memory of the external storage device:
a file; and
second print instructing device information that specifies a print instructing device for printing of the file;
a receiving unit configured to receive the printing instruction information including the first print instructing device information from the transmitting unit;
a processor;
memory, containing computer executable instructions that, when executed, cause the processor to provide a determining unit configured to:
receive, from the receiving unit, the printing instruction information including the first print instructing device information;
receive, from the external storage device, through the interface, second print instructing device information that specifies a print instructing device for printing of the file; and
determine whether the first print instructing device information included in the printing instruction information transmitted by the print instructing device is identical to the second print instructing device information stored on the external storage device; and
a printing unit configured to print the file stored on the external storage device based upon the printing instruction information, when the determining unit determines that the first print instructing device information is identical to the second print instructing device information.

13. The printing system according to claim 12, further comprising:
a dividing unit configured to divide the file into first data and second data; and
a storing unit configured to store the first data onto the print instructing device and store the second data onto the external storage device,
wherein the receiving unit receives the first data as the printing instruction information including the first print instructing device information from the transmitting unit,
wherein the printing unit prints the second data stored on the external storage device by using the first data, when the determining unit determines that the first print instructing device information is identical to the second print instructing device information.

14. The printing system according to claim 12, wherein the image forming device is configured to print the file stored on the memory of the external device directly from the memory of the external device when the external device is attached to the image forming device.

15. An image forming device comprises:
a receiving unit configured to receive from an external printing instruction device provided outside the image forming device, printing instruction information including first print instructing device information that specifies the external print instructing device which issued the printing instruction information;
an interface configured to receive an external storage device which stores in a memory of the external storage device:
a file; and
second print instructing device information that specifies a print instructing device for printing of the file;
a processor;
memory, containing computer executable instructions that, when executed, cause the processor to provide a determining unit configured to:
receive, from the receiving unit, the printing instruction information including the first print instructing device information;
receive, from the external storage device, through the interface, second print instructing device information that specifies a print instructing device for printing of the file; and
determine whether the first print instructing device information included in the printing instruction information received from the external print instructing device is identical to the second print instructing device information stored on the external storage device; and
a printing unit configured to print the file stored on the external storage device based upon the printing instruction information, when the determining unit determines that the first print instructing device information is identical to the second print instructing device information.

16. The image forming device according to claim 15,
wherein the file is divided into first data stored on the external print instructing device and second data stored on the external storage device,
wherein the receiving unit receives the first data as the printing instruction information including the first print instructing device information from the external print instructing device,
wherein the printing unit prints the second data stored on the external storage device by using the first data, when the determining unit determines that the first print instructing device information is identical to the second print instructing device information.

17. The image forming device according to claim 15, wherein the image forming device is configured to print the file stored on the memory of the external device directly from the memory of the external device when the external device is attached to the image forming device.

* * * * *